Figure 1:
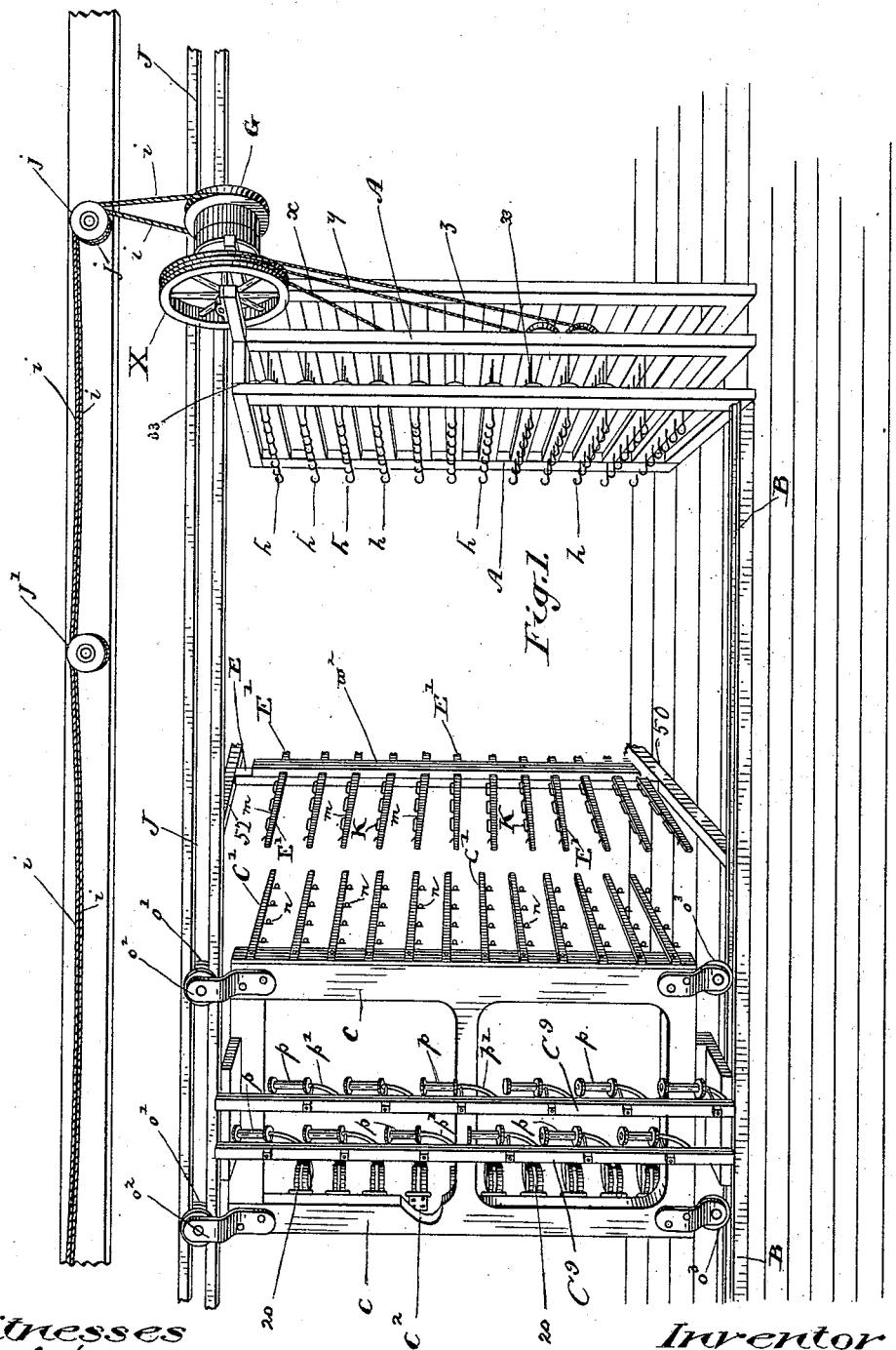

(No Model.) 4 Sheets—Sheet 1.

W. H. AVIS.
MACHINE FOR THE MANUFACTURE OF TWINES, &c.

No. 449,991. Patented Apr. 7, 1891.

Witnesses
F. B. Fetherstonhaugh
H. G. McMillan

Inventor
Walter H. Avis
by Donald C. Ridout & Co
att'y

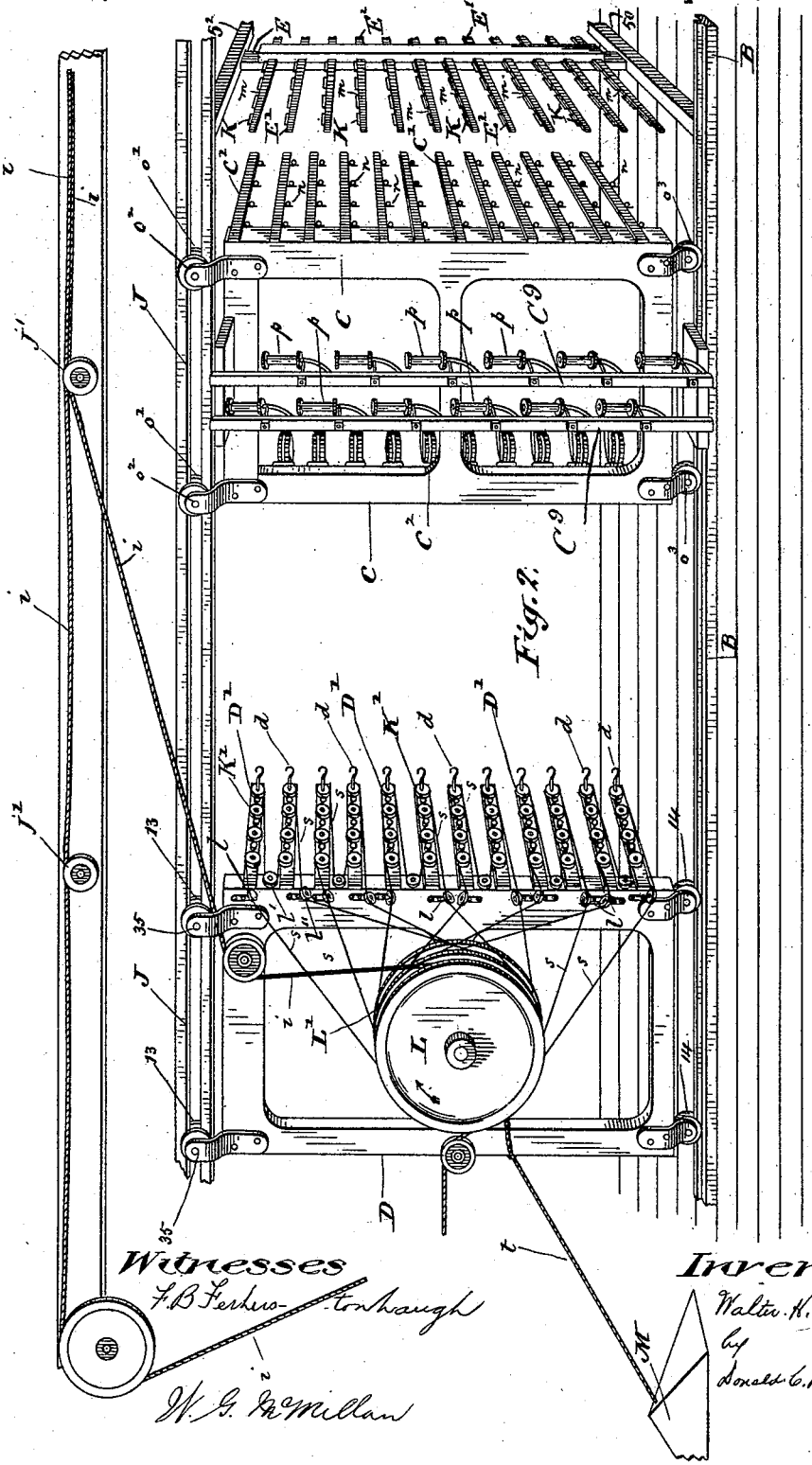

(No Model.) 4 Sheets—Sheet 3.
W. H. AVIS.
MACHINE FOR THE MANUFACTURE OF TWINES, &c.
No. 449,991. Patented Apr. 7, 1891.
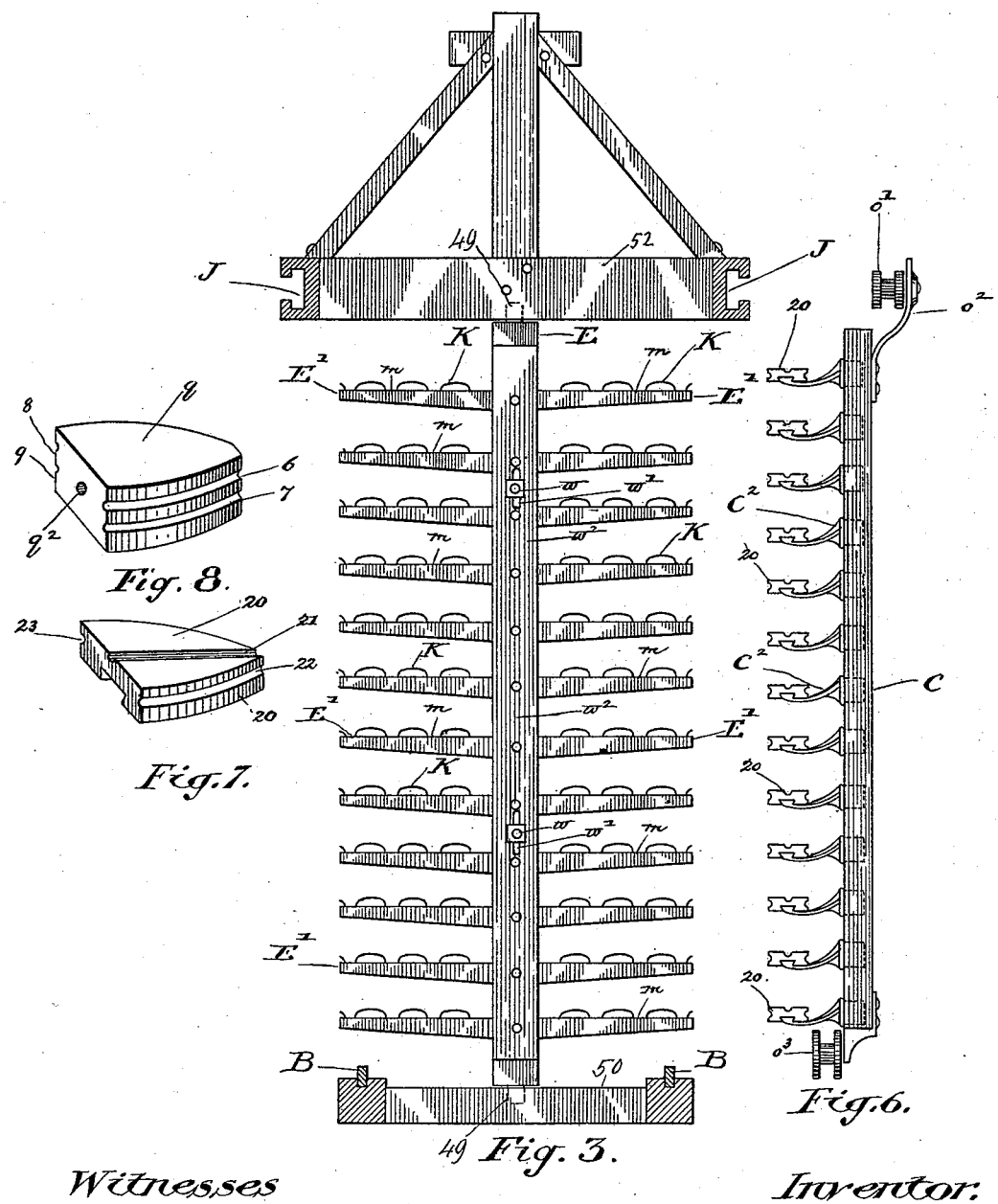
Witnesses
Inventor:

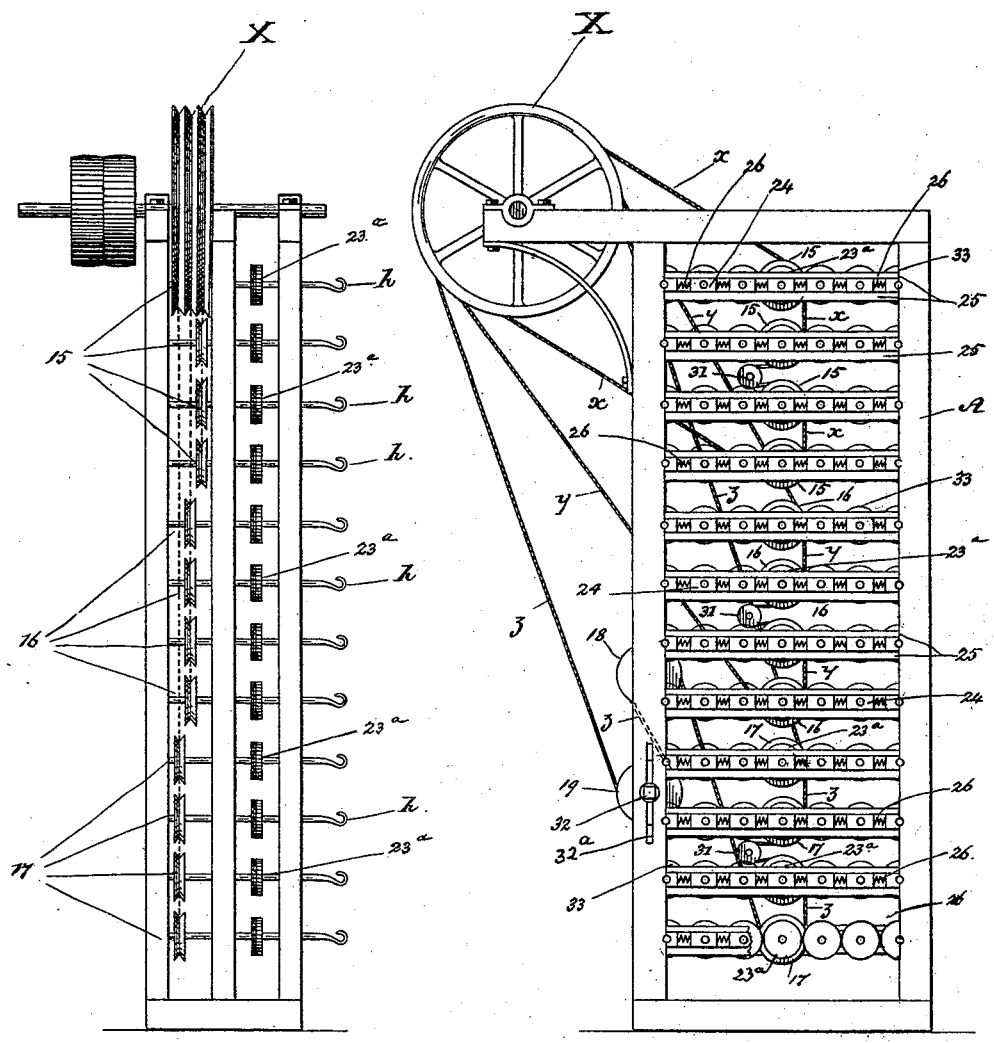

UNITED STATES PATENT OFFICE.

WALTER H. AVIS, OF DOVERCOURT, ASSIGNOR TO ROBERT CHARLES FISHER, OF TORONTO, CANADA.

MACHINE FOR THE MANUFACTURE OF TWINES, &c.

SPECIFICATION forming part of Letters Patent No. 449,991, dated April 7, 1891.

Application filed September 5, 1889. Serial No. 323,015. (No model.)

*To all whom it may concern:*

Be it known that I, WALTER HERBERT AVIS, manufacturer, of the village of Dovercourt, in the county of York, in the Province of Ontario, Canada, have invented certain new and useful Improvements in Machines for the Manufacture of Twines, &c., of which the following is a specification.

The object of the invention is to provide means for the manufacture of twines and small ropes, whereby considerable width of walk may be dispensed with and twines and small ropes of the best quality produced with great rapidity and economy; and it consists, essentially, of a vertical fixed twisting-frame located at one end of the walk with whirl-hooks so arranged that adjoining whirl-hooks in the same rows are made to rotate in opposite directions and adapted to make strands with a right or a left hand twist, as may be desired, posts with vertically-adjustable arms adapted to rotate so as to shift the position of the arms and serving to keep separate the various sets of strands, a movable guide or parting-frame adapted to move on a track and having arms provided with parting-hooks, which arms pass between the adjustable arms on the rotary posts, and a movable laying-frame at the other end of the walk, arranged with arms carrying whirl-hooks, and a drag to regulate the motion of the movable laying-frame on the walk, substantially as hereinafter specified.

In the drawings, Figure 1 is a view showing part of the upper end of the walk with the vertical fixed twisting-machine and the gear for operating the same, one of the rotary posts, and the movable parting-frame. Fig. 2 is a view of part of the lower end of the walk with another of the rotary posts and the movable parting-frame and the movable laying-frame with its drag. Fig. 3 is a detail of one of the rotary posts with its adjustable arms. Fig. 4 is a front view of the fixed vertical twisting-frame, parts being broken away. Fig. 5 is a side view of the fixed vertical twisting-frame. Fig. 6 is a detail of the back end of the parting-frame, showing the grooved tops. Figs. 7 and 8 are detail perspective views of a laying-top and core-head, respectively.

In the drawings like letters and figures of reference indicate corresponding parts throughout the several views.

A is a stationary vertical twisting-frame, located at one end of the walk.

B is a single rail or track running the full length of the walk, on which the movable guide or parting frame C is adapted to travel. The movable laying-frame D is at the other end of the track, and is shown in Fig. 2 moved up toward the vertical twisting-frame as when the strands have become somewhat twisted during the making of the twine or cord. A driving-pulley (not shown in the drawings) communicates motion to the wheel X, which gives motion to the endless cord $x\,y\,z$, (shown in Figs. 1, 4, and 5,) which rotates the whirl-hooks $h$ in the twisting-frame A, the adjacent hooks of each horizontal series of hooks being caused to rotate, as hereinafter described, in opposite directions, so as to give a right or left hand twist to the strands, as may be desired.

The endless rope $i$ is driven by the pulley G on the same shaft as wheel X and passes over the double pulleys $j\,j$ and overhead guide-sheaves $j'$ the whole length of the walk. The endless rope $i$ gives motion to the pulley L of the laying-frame D at the other end of the walk. (See Fig. 2.)

E is one of the rotary posts carrying arms E', which are vertically adjustable by means of the screws $w$, working in slots $w'$, formed in the frame-piece $w^2$, to which the arms E' are attached, said arms being held in position by clamping the frame-piece $w^2$ by means of the screw $w$ against the rotary post E. In Figs. 1 and 2 the arms on the far side of the post E are shown as broken away. This post E has pivots 49, adapted to work in holes formed therefor in the base 50 and the frame 52 for the upper track, as shown in Fig. 3. These arms E' project to opposite sides of the post, so that one post may be utilized for two adjacent walks. They can be moved up or down so far as the slots $w'$ permit, and each post can be rotated upon its pivots 49 so as to turn the arms E' lengthwise of the walk out of the way. The arms E' carry the bridges K, between which bridges spaces $m$ are left to receive the yarns attached to the whirl-hooks $h$, which yarns also pass through the parting-hooks $n$ in the guide or parting frame C. These rotary posts E are placed along the track at distances of thirty or forty feet to carry the yarn as well as the finished twine or cord. The guide or parting frame C is partly suspended from an upper grooved track J, on which the wheels $o'$ travel, said wheels $o'$ being attached to the parting-frame C at each of the upper corners thereof by the brackets $o^2$, as particularly shown in Fig. 6, the wheels $o'$ traveling in the lipped track J. (Best shown in Fig. 3.) The lower corners of the frame C are kept in position on the lower track B by the grooved wheels $o^3$. This frame has arms C', on which are fixed guide-hooks $n$, the arms being so placed as to pass between and over the arms E' as the guide-frame is moved or pushed down the track.

$p$ are spools on the guide-frame, on which the cores are wound, which are placed on spindles attached to frames $C^9$ on the side of the guide or parting frame C.

$C^2$ are the arms on the back end of the parting-frame, on which the twisted yarn and twine rests. On the ends of these arms are the tops 20, with three grooves 21, 22, and 23, as shown in Fig. 7. The pointed ends of these tops 20 point toward the laying-frame D at the end of the walk opposite that in which the vertical twisting-frame is located, the strands being twisted and the cords formed behind the pointed ends of the tops as the parting-frame C is pushed along the track.

The core-heads $q$ (shown in Fig. 8) may be substituted for the tops 20 when it is desired to form a rope of four or more strands with a core or heart. The core-head $q$ is pierced with a hole $q^2$ for the core, and has grooves 6, 7, 8, and 9 to receive twisted strands, which are to be formed around the core when twine or small rope with a core or heart is formed, the core passing through the hole $q^2$ and unwinding from the spools $p$ as the rope is formed, as hereinafter described.

In Fig. 2 the guide-frame C is shown as having been moved to the end of the track, where the laying-frame is located. This laying-frame carries arms D', through which pass the whirl-hooks $d$. These whirl-hooks are driven by a single cord $s$, which passes around grooves in the pulley L', formed on wheel L, and over and under the tiers of pulleys K', the cord passing from said pulley L' over a guide-pulley $l$ at the top of the frame, to and around the top tier of pulleys to a guide-pulley $l'$, thence over and around the second tier of pulleys to another guide-pulley $l''$, from thence to the middle groove in the pulley L', and after passing around said pulley it passes again to a fourth guide-pulley corresponding to guide-pulley $l$, and thence around two or more tiers of pulleys and guide-pulleys to the third groove in the pulley L', and again around two more tiers of pulleys back to said third groove in the driving-pulley, and around two more tiers of pulleys, as before, until the cord has passed around all the pulleys, and after passing around all the small pulleys it returns to the middle groove in the large or driving pulley L'. The grooves in the pulley L' should of course be made wide enough to each take in two of the loops of the cord $s$ without the loops interfering with each other; but it is obvious that the pulley L may be provided with a groove for each loop.

The wheel L is driven by the endless rope $i$, which extends the whole length of the walk, and the wheel can be driven in the direction shown by the arrow or in the opposite direction, according to the portion of the rope employed, said rope being looped under the pulley L', formed on wheel L. When driven in the direction of the arrow, the wheel L acts as a brake on the motion of the laying-machine on its track, which may suffice for small twines; but a drag-brake M is usually employed, attached to the frame of laying-machine D by the cord $t$. This laying-frame D is suspended from the overhead track J by the wheels 13, which run in the track, which is lipped to hold the wheels in place, and the wheels are journaled on brackets 35 at the upper corners of the laying-frame, the lower portion of the laying-frame being held in place by the grooved wheels 14, which run on the track B in a manner similar to the parting-frame C.

In Fig. 4 is a front view of the vertical twisting-frame A, which in this drawing is designed for eighty-four spindles and contains twelve tiers of whirl-hooks $h$, seven in each tier. This frame is provided with a grooved wheel X, as also shown in Fig. 5, to receive the endless cord $x\,y\,z$, which passes three times around said pulley X, each loop thereof passing around one of the groups of pulleys 15, 16, and 17. That portion or loop marked $x$ operates on the pulleys 15 on the upper four tiers, turning them all in the same direction and passing around an idler 31, so as to give the cord more friction on the pulleys. The loop $x$, after passing around the pulleys 15, passes back to the pulley X, entering another groove, after which it passes (as loop $y$) to the second group of pulleys 16, and after passing around them as before returns to the pulley X and passes around in the third groove, thus forming another loop $z$, which passes around the pulleys 17 in the lower four tiers and returns to the first groove in the pulley, passing on its way around the pulleys 18 and 19. The latter is made adjustable by a screw 32, working in a slot $32^a$ in the frame and clamping the pulley 19 in the desired position to take up any slack formed in the endless cord, and thus keep a proper tension in the cord.

In Fig. 5 it is seen that the several sets of pulleys 15, 16, and 17 are arranged in "echelon," one set above the other vertically under the respective grooves in the grooved wheel X. The friction-pulleys 33 $23^a$ in each tier (in front of the pulleys 15, 16, and 17) are in contact with each other, as shown at the bottom of Fig. 4, where parts are represented as broken away to show this, so that when the central one 23$^a$, carrying a whirl-hook, is driven by its pulley the adjoining ones acquire motion from the others, with their respective whirl-hooks rotating alternately in opposite directions, so that a right or left hand twist can be given to the strands, according to the whirl-hooks to which they are attached. The driving pulleys 15, 16, and 17 are fixed to the same whirl-hooks as the central friction-pulleys 23$^a$, which are of less diameter than the driving-pulleys. Journal-blocks 24 for the whirl-hooks $h$ are slipped into place in the grooved cross-pieces 25, and are held apart by the springs 26, which hold the journals 24 in such position as to give the adjoining contact-pulleys 33 a grip on each other. Each friction or contact pulley 33 23$^a$ carries a whirl-hook $h$, the whirl-hooks being journaled, as indicated in Fig. 4.

If a three-strand cord or twine is required, an equal number of threads, which go to form the separate strands, are attached in sets to three alternate whirl-hooks $h$ on the vertical twisting-frame A, so as to receive a right or left hand twist, as may be desired, and the threads are then placed in corresponding parting-hooks $n$ on an arm C' of the guide or parting frame C. The parting-frame C is then pushed along the track toward the laying-machine D three hundred or four hundred feet distant, the arm C' passing between the arms E' on the stake-heads E and laying the assorted threads in the spaces $m$, formed between the bridges $k$ on the arms E'. When the threads which go to form the three strands of twine or cord are thus separated and each set tied onto three or a corresponding number of hooks $d$ on the laying-frame D, the whirl-hooks $h$ on the vertical twisting-frame A are thrown into rapid rotary motion, twisting the threads lying in the spaces $m$ on the stake-heads E in the same direction or manner, while the hooks $d$ remain at rest. By the shortening up produced by such twisting the laying-frame D is drawn a short distance along the track toward the parting-frame C, the motion being checked by the drag M. When sufficient twist has been given to these threads which form the strands, the motion of the whirl-hooks $h$ is suspended for a period and the operation of continuing the formation of the three-strand twine or cord is as follows: Two of the twisted strands attached to two of the hooks $d$ on the laying-frame D are removed from the respective hooks to which they were attached while the strands were being twisted, as just mentioned, and the three twisted strands are tied onto one and the same hook $d$ on the laying-frame D. The whirl-hooks $h$ on frame A and the hook $d$, to which the three strands are now attached, are then caused to rotate, and the guide or parting frame C is pushed back toward the other end of the walk, where the vertical twisting-frame A is situated, and the twisting goes on from both ends of the walk, the twine or cord forming behind the pointed ends of the tops 20 on the rear arm C' of the parting-frame C as it is pushed along the track. This hook $d$ on the laying-frame D in this final operation is caused to rotate in the direction desired by passing the endless cord $i$ under the pulley L' on wheel L and the direction is one opposite to that of the whirl-hooks $h$ utilized in the vertical twisting-frame A, and this hook $d$, with the others on frame D, is caused to run at a less rate of speed than the whirl-hooks $h$ utilized at the other end of the walk. The motion of any of the whirl-hooks $d$ can be reversed when necessary in the usual manner, (according as a right or left hand twist is given to the strands by the whirl-hooks $h$, which are utilized on the frame A,) so that each end of the forming cord or twine may receive a twist in opposite directions. In the same manner a two or four strand twine or cord may be formed, one or two cords being in the course of formation at the same time on each of the twelve rows of the frames indicated in the drawings.

When forming a rope with a core, the twisted strands are first formed as hereinbefore mentioned, passing through the guide-hooks $n$. The core is then unwound from the spool $p$ on the guide-frame C and passed through the hole $q^2$, formed on the core-head $q$ and attached to a hook on laying-frame D. The twisted strands from guide-hook $n$ are then passed onto grooves 6, 7, 8, and 9 on the core-head $q$, (see Fig. 8,) according to the number of strands in the cord and attached to the same hook as the core. The twisting is then started at the whirl-hooks $h$ in the stationary twisting-frame A and the whirl-hooks $d$ on the movable laying-frame D, and the rope is formed around the core, said core passing from the spool $p$ through the hole $q^2$ in the core-head to the whirl-hooks $d$ on the laying-frame D, the rope with the core being formed behind the core-head $q$ as the guide-frame is moved toward the vertical twisting-frame A.

In the drawings I have shown a twisting-frame adapted to carry eighty-four whirl-hooks; but the number may be increased or diminished, as desired, as well as the number of other parts of the other operative portions of the machine, a piece of rope or twine extending the whole length of the walk being formed by each tier of whirl-hooks on the vertical twisting-frame and laying-frame, if so desired, the number of hooks employed in the twisting-frame varying according to the number of strands required in the rope or cord.

My system renders it possible to economize space and power and form twine, cord, &c., of the best quality with great rapidity.

What I claim as my invention is—

1. In a twisting and laying machine for forming twine, cord, or rope, a vertical stationary twisting-frame having a series of whirl-hooks in tiers, mechanism for rotating the adjacent hooks in opposite directions, vertical rotary posts with vertically-adjustable arms to receive and keep separate the sets of strands, mechanism for adjusting said arms, and a movable guide or parting frame having arms carrying parting-hooks to receive the strands before and after being twisted, in combination with a movable laying-frame having arms carrying whirl-hooks, to which the strands of the cords to be formed are attached, mechanism for rotating said whirl-hooks, and the laying-tops or core-heads, the whole being arranged and operated substantially as described.

2. The vertical stationary twisting-frame A, having the sets 15, 16, and 17 of pulleys arranged in the frame on spindles in echelon to receive the cord $x\ y\ z$, in combination with said spindles and cord, the wheel X, the friction or contact wheels 33 and $23^a$, whirl-hooks $h$, and means for taking up the slack of the endless cord $x\ y\ z$, the whole being arranged and the whirl-hooks $h$ actuated substantially as described and specified.

3. The combination of the rotary vertical post, the arms E' on said post, having spaces $m$ and bridges K on their upper sides, and means for adjusting the said arms vertically, as set forth.

4. The vertical parting-frame C, the upper track J, the wheels $o'$, brackets $o^2$, the lower track B, wheels $o^3$, arms C', and parting-hooks $n$, fixed to said arms C', arranged substantially as described, and for the purpose specified.

5. The vertical parting-frame C, the upper track J, and lower track B, in combination with arms C', parting-hooks $n$, arm $C^2$, and a grooved top, the whole being arranged substantially as described, and for the purpose specified.

6. The combination of the vertical movable laying-frame D, the grooved upper track J and lower track B, wheels 13 and brackets 35, wheels 14, wheel L, journaled on said frame, endless cord $i$, pulley L', cord $s$, guide-pulleys $l$, and whirl-hooks $d$, having pulleys K', substantially as described, and for the purpose specified.

7. The combination of vertical twisting-frame A, wheel X, pulleys 15, 16, and 17, arranged in echelon on said frame, contact-pulleys 33 and $23^a$ and idler-pulleys 31, whirl-hooks $h$, springs 26, endless cord $x\ y\ z$, pulley 18, pulley 19, journaled on said frame, and means for adjusting said pulley 19 vertically, substantially as described and specified.

Toronto, August 5, 1889.

WALTER H. AVIS.

In presence of—
CHARLES C. BALDWIN,
W. G. MCMILLAN.